US006205853B1

(12) United States Patent
Dei et al.

(10) Patent No.: US 6,205,853 B1
(45) Date of Patent: Mar. 27, 2001

(54) METHOD FOR TESTING FUNCTIONS OF PAINTING APPARATUS AND APPARATUS FOR THE SAME

(75) Inventors: Shinji Dei; Masao Ogawa, both of Mie-Ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/005,821

(22) Filed: Jan. 12, 1998

(30) Foreign Application Priority Data

Jan. 10, 1997 (JP) .................................................. 9-002881
Mar. 6, 1997 (JP) .................................................. 9-051485

(51) Int. Cl.$^7$ ............................................... G01M 19/00
(52) U.S. Cl. .............................................................. 73/168
(58) Field of Search ........................... 73/49.8, 49.7, 73/40, 46, 168, 4–6; 239/71

(56) References Cited

U.S. PATENT DOCUMENTS 4,697,464 * 10/1987 Martin ..................................... 73/168
5,261,741 * 11/1993 Hladis .
5,316,217 * 5/1994 Guzowski et al. .

* cited by examiner

*Primary Examiner*—Robert Raevis
(74) *Attorney, Agent, or Firm*—Liniak, Berenato, Longacre & White

(57) ABSTRACT

A painting device functional testing apparatus for testing functions of painting devices of a painting apparatus comprises the same devices as the painting apparatus and a paint supply system having the same pipe configuration as the painting apparatus. The functions of each device of the painting apparatus are tested by replacing one of the devices by a new device to be installed in the painting apparatus, measuring the pressure at the paint supply side and the paint exhaust side of the replaced device, and detecting the pressure variation of the replaced device.

3 Claims, 10 Drawing Sheets

Air motor: generating torque

Air motor: pressure drop at switching, follow-up time

Supply pump: generating output pressure

Supply pump: pressure drop follow-up time at switching

Valve selector: leakage

Valve selector: operational lug

Pressure controller: follow-up property

Pressure controller: pressure control property

METHOD FOR TESTING FUNCTIONS OF PAINTING APPARATUS AND APPARATUS FOR THE SAME

BACKGROUND OF THE INVENTION

1. Field of the Invention

The present invention relates to a method for testing functions of constituting devices of a painting apparatus and an apparatus for the same.

2. Related Art

The conventional paint supply device is shown in FIG. 14. As shown in FIG. 14, the paint supply device B comprises an air cylinder device 101 for a pump connected to an air supply such as an external air compressor (not shown) and a pump device 102 for painting connected under the air cylinder device 101.

In particular, a cylindrical paint tank 104 of the pump device 102 is placed under the air cylinder device 101 over a support member 103. A cap 106 having an inlet valve 105 of a ball valve is screwed in the lower portion of the paint tank 104. An end of a valve rod 109 connected to a piston rod 108 of a piston 107 of the air cylinder device 101 is inserted into the upper portion of the paint tank 104. There screwed in the valve rod 109 a hooked cylindrical member 112 which has a paint exhaust hole 110 constituted by a central hole and a side hole which are communicated from the other at one end and which comprises a delivery valve 111 of a ball valve at the other end having a small diameter. A seal member 113 is placed around the hooked cylindrical member 112 so as to prevent the paint from leaking when the pump is operated.

As the air cylinder device 101 for pump is operated, the piston 107 is driven, and the valve rod 109 together with the piston rod 108 is moved vertically. Then, the paint in the external paint tank PT is sucked into the paint tank 104, and the paint in the paint tank 104 is supplied to the spray gun 116 through the paint exhaust hole 110, an upper room 104a of the paint tank 104, a pipe 114, and a regulator 115. It should be noted that in order to limit the vertical movement of the piston 107, a detecting rod 117 is connected to the upper portion of the piston 107 and an engaging part 118 is placed on the detecting rod 117, so that the position is detected by external limit switches 119, 120. The regulator 115 is communicated to an air supply 122 through a solenoid valve 121 for adjusting the pressure. Further, the spray gun 116 is communicated to the air supply 124 for trigger operating through a trigger solenoid valve 123.

However, with thus constructed paint supply device B, when the paint is supplied to the spray gun 116, if the seal property of the seal member 113 of the pump device 102 for pump is lowered, the slide resistance due to the valve rod 109 is decreased. Since the reciprocating motion per unit time of the valve rod 109 is increased to obtain the necessary reference pressure, the frequent pulsation of the paint due to the reciprocating motion of the valve rod 109 cannot be adjusted by the regulator 115. In result, the paint pattern is disordered. Further, this fasten the wear of the piston 107 which slides in the cylinder of the air cylinder device 101 and shortens the life time of the air cylinder device 101.

Further, when any of parts or devices in the painting apparatus is replaced by a new one after it reaches life period, the new part is assumed to work normally and placed in the painting apparatus without it is tested.

However, in practice, when the new part or device is placed in the painting apparatus, the replaced part or device frequently does not work normally. In the manufacturing line, if the operation of the devices and the painting condition are checked by eye or gauge, and the defective is found, it can be replaced by a new one again. However, the instant change of the gauge cannot be checked, which causes the defectives.

SUMMARY OF THE INVENTION

It is an object of the present invention to provide a method for testing functions of painting devices of a painting apparatus and an apparatus for the same, which supply the devices having stable quality to be in stalled in the paint apparatus.

First aspect of the present invention is a method for testing functions of painting devices of a painting apparatus.

The method for testing functions of painting devices of a painting apparatus comprising an air supply source, an air motor driven by air from the air supply source, a supply pump operated by the air motor, a plurality of paint tanks each containing paint, a valve selector for switching paints to be used, a spray gun having a switching cylinder, a spray nozzle for spraying the paint, and a pressure adjusting device for adjusting the pressure applied on the paint to be sprayed of the present invention comprises 1) providing a test painting system comprising the same devices as the painting apparatus and a paint supply system having the same pipe configuration as the painting apparatus, 2) providing fluid pressure sensors between each of the constituting devices of the test painting system, 3) providing air pressure sensors between each of the constituting devices of the test painting system, 4) measuring supply fluid pressure and exhaust fluid pressure of the constituting devices by the fluid pressure sensors and the air pressure sensors, and 5) comparing the measured supply fluid pressure and the measured exhaust fluid pressure, thereby the functions of the constituting devices of the test painting system is tested.

Here, an air pressure sensor may be provided at the air motor for operating the supply pump of the test painting system and the pressure controller of the test painting system. A fluid pressure sensor is provided between the supply pump of the pain supply pump for supplying paint from the paint tank and the valve selector, between the valve selector and the pressure controller and between the pressure controller and the spray gun. Functions of the consisting devices of the test painting system are tested by measuring the fluid pressure of the paint supply side of the constituting device and the fluid pressure of the paint exhaust side of the constituting device, detecting the difference between the measured fluid pressure of the paint supply side and the measured fluid pressure of the paint exhaust side.

Further, normally operated devices may be installed in the test painting system. One of the normally operated devices is replaced by a new device to be tested. The functions of the replaced new device are tested by driving the test painting system and spraying the paint.

A painting device functional testing apparatus for testing functions of painting devices of a painting apparatus comprising an air supply source, an air motor driven by air from the air supply source, a supply pump operated by the air motor, a plurality of paint tanks each containing paint, a valve selector for switching paints to be used, a spray gun having a switching cylinder, a spray nozzle for spraying the paint, and a pressure adjusting device for adjusting the pressure applied on the paint to be sprayed of the present invention comprises 1) the same devices as the painting apparatus and a paint supply system having the same pipe configuration as the painting apparatus, 2) fluid pressure sensors provided at the paint supply side and the paint exhaust side of the supply pump, the valve selector, the pressure controller and the spray gun, and 3) air pressure sensors provided at an air supply pipe extended from the air supply source to the air motor and at an air supply pipe extended from the air supply source to the pressure controller. The functions of each device of the painting apparatus are tested by replacing one of the devices by a new device to be installed in the painting apparatus, measuring the pressure at the paint supply side and the paint exhaust side of the replaced device, and detecting the pressure variation of the replaced device.

According to the method for testing the functions of the painting device of the present invention, the paint device functional testing apparatus is constituted as same as the manufacturing line. Accordingly, the functions of every devices to be utilized in the manufacturing line can accurately be tested, which omits the trial on the manufacturing line. Further, the trouble occur ring when the unit is replaced by a new one can be prevented.

Furthermore, the functions of the new units to be installed in the actual paint supply system are tested by thus constructed painting device functional testing apparatus before they are installed in the actual paint supply system, so that it never happens that the replaced new unit does not work normally. Accordingly, the unit does not have to be changed again like the conventional method.

The second aspect of the present invention is a method for detecting leakage of fluid in a pump apparatus.

The method for detecting leakage of fluid in a pump apparatus comprising a pump area having an inlet valve mechanism, a valve rod having a delivery valve mechanism to slide into the pump, a fluid pressure cylinder for a pump having a piston rod to which the valve rod is connected of the present invention comprises steps of 1) providing a fluid pressure cylinder for detection at the rear of the fluid pressure cylinder for pump, 2) connecting the piston rod of the fluid pressure cylinder for detection to a detecting rod connected to the back of a piston of the fluid pressure cylinder for pump, 3) providing a pipe communicated to a cylinder room of the fluid pressure cylinder for detection and extended to outside through a pressure sensor and an exhaust solenoid valve, 4) closing the exhaust solenoid valve by detecting the limit of the movement of the detecting rod with a limit switch, 5) moving the piston of the fluid pressure cylinder for pump, and 6) measuring the time that the pressure sensor detects a predetermined reference pressure to detect the leakage of fluid in the delivery valve mechanism.

An apparatus for detecting leakage of fluid in a pump apparatus comprising a pump area having an inlet valve mechanism, a valve rod having a delivery valve mechanism to slide into the pump, a fluid pressure cylinder for a pump having a piston rod to which the valve rod is connected of the preset invention comprises 1) a fluid pressure cylinder for detection provided at the rear of the fluid pressure cylinder for pump, 2) the piston rod of the fluid pressure cylinder for detection connected to a detecting rod connected to the back of a piston of the fluid pressure cylinder for pump, 3) a pipe communicated to a cylinder room of the fluid pressure cylinder for detection and extended to outside through a pressure sensor and an exhaust solenoid valve, 4) a limit switch for detecting the limit of the movement of the detecting rod. The leakage of fluid in the delivery valve mechanism is detected by closing the exhaust solenoid valve by detecting the limit of the movement of the detecting rod with a limit switch, moving the piston of the fluid pressure cylinder for pump, measuring the time that the pressure sensor detects a predetermined reference pressure.

Here, the time change of pressure of the pressure sensor can be recorded by a recording unit provided at a control panel.

Further, the fluid pressure cylinder for detection is removally provided in the fluid pressure air cylinder for pump.

Furthermore, the pump apparatus is a pump apparatus for painting, and the fluid is paint.

According to the second aspect of the present invention, the paint leakage in the pump device can be detected at earlier stage, so that the paint defect can be prevented.

Further, the fluid pressure cylinder for detection is provided so as to move together with the fluid pressure cylinder for pump, and the paint leakage from the seal member when the valve rod is moved is detected by the time until the pressure sensor in the fluid pressure cylinder for detection reaches a predetermined reference voltage. Accordingly, the seal condition is easily known with the simple device. Further, the wear of the piston in the air cylinder device for pump can be suppressed, which increases the durability of the air cylinder device.

Furthermore, the air cylinder device for detection is readily installed in the air cylinder device for pump by a bolt or a screw, so that the air cylinder device for detection can be removed easily. Therefore, the air cylinder device for detection can be installed in the exist paint supply device, which is very economic and which makes the maintenance easier.

PREFERRED EMBODIMENT OF THE PRESENT INVENTION

Figure 1:
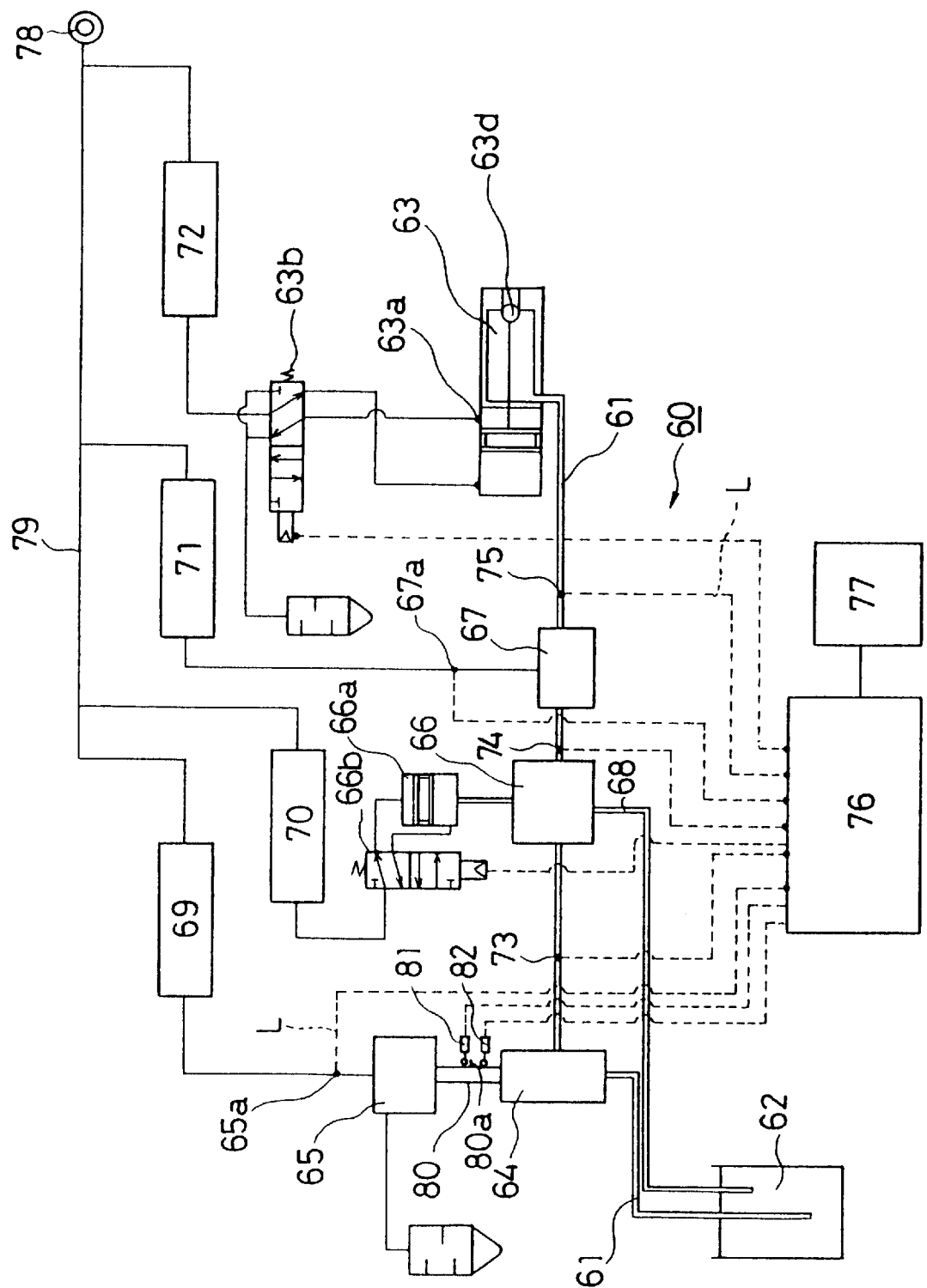
FIG. 1 is a circuit diagram showing the structure of an air supply pipe or a paint supply pipe which is utilized in a functional testing method for a painting device.

FIG. 1 shows a painting device functional testing apparatus according to the first embodiment of the present invention. As shown in FIG. 1, the painting device functional testing apparatus 60 comprises a paint supply pipe 61 which is to supply paint from a paint tank 62 to a spray gun 63 for spraying the paint, and which is arranged in the same configuration as the spray painting line operation. Reference numeral 64 is a supply pump for sucking paint from the paint tank 62 and supplying the paint to a valve selector 66. The supply pump 64 is driven by an air motor 65 to which air is supplied from an air supply 78 through an air supply pipe 79 with a controller 69. There provided micro switches 81, 82 in a moving area of a piston rod 80 of the air motor 65. The paint supply rate is controlled by these micro switches 81, 82. Further, there arranged an air pressure sensor 65a between the air motor 65 and the controller 69.

The valve selector 66 to which the paint supply pipe 61 extended from the supply pump 64 is connected is a device for switching valves of a plurality of paint tanks 62. The valve selector 66 has a switching cylinder 66a and a switching valve 66b connected. The switching valve 66b is connected to the air supply 78 through the controller 70 and connected to a paint feedback pipe 68 for returning the unnecessary paint in the valve selector 66 to the paint tank 62 when the switching valve 66b is switched. Further, there provided a fluid pressure sensor 73 between the valve selector 66 and the supply pump 64 at the paint supply pipe 61. Reference numeral 67 is a pressure controller for controlling the pressure applied on the paint supplied to the spray gun 63. There provided a fluid pressure sensor 74 between the valve selector 66 and the pressure controller 67. Air is supplied to the pressure controller 67 from the air supply 78 through the controller 71. Between the controller 71 and the pressure controller 67, an air pressure sensor 67a is provided, and a fluid pressure sensor 75 is provided at the paint supply pipe 61 towards the spray gun 63.

A control valve 63d for controlling the paint spraying rate of the spray gun 63 is controlled by a switching cylinder 63a. A switching valve 63b of the spray gun 63 is connected to the air supply 78 through a controller 72.

The controllers 69, 70, 71, 72 control the air pressure of the air supplied to the devices for supplying the paint, e.g., the air motor 65, the switching valve 66b, the pressure controller 67 and the switching valve 63b. They usually comprise air filters and pressure gauges. These controllers control the air pressure so that the suitable air is supplied to every device.

Reference numeral 76 is a control unit which is connected to the air pressure sensors 65a, 67a, the fluid pressure sensors 73, 74, 75 and a code L and which stores and processes the measured data and which outputs a printing signal to a printer 77. Further, the control unit 76 is connected to the micro switches 81, 82 for detecting the position, placed to be in contact with a detecting unit 80a of the piston rod 80 of the air motor 65 and further connected to the switching valve 66b and the switching valve 63b with the wires so as to control the connected devices.

Next, a method for testing the functions of the painting device utilizing thus constructed apparatus will be explained.

In this embodiment, a case that the air motor 65 is replaced by a new one will be described. In this vase, parts such as a packing at the connecting location with the air supply pipe 79 are replaced and a new air motor is installed in the paint supply system of the painting apparatus.

First, the air motor installed in the painting device functional testing apparatus 60 as a standard unit is removed and the new air motor 65 is installed therein. In this case, the installed devices in the testing apparatus 60 such as the valve selector 66, the pressure controller 67 and the spray gun 63 are the standard units.

Functional test of the air motor

For the functional test of the air motor 65, the air pressure sensor 65a provided at the air supply pipe 79, the fluid pressure sensor 73 and the fluid pressure sensor 75 which are provided at the paint supply pipe 61 of the supply pump 64 are utilized.

In order to test the generating torque of the air motor 65, the valve selector 66 is opened and the controller 67 is operated to operate the spray gun 63 so that the air motor 65 is operated repeatedly.

Figure 2:
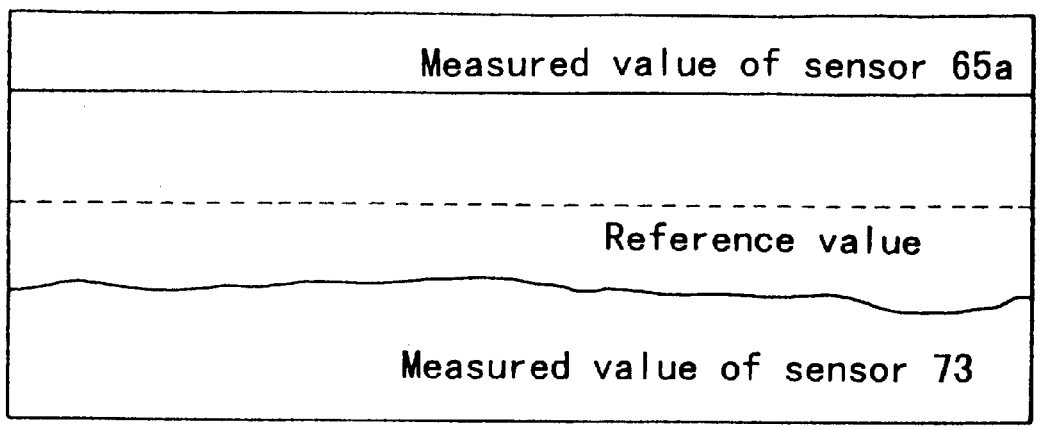
FIG. 2 is a result of the test of a generating torque function of an air motor for driving a supply pump.

Assume that the result is the one shown in FIG. 2 which is a graph from the printer 77. The measured value of the air pressure sensor 65a is stable but the detected value of the fluid pressure sensor 73 is varied. This means that the generating torque of the air motor 65 is abnormal.

In order to test the pressure lug of the air motor 65, the valve selector 66 is opened and the controller 67 is operated to operate the spray gun 63 so that the air motor 65 is operated repeatedly.

Figure 3:
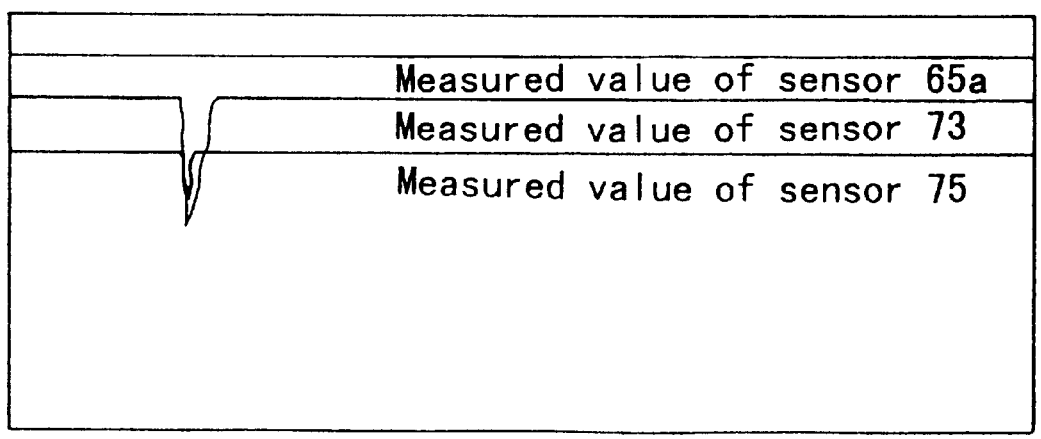
FIG. 3 is a result of the test of a pressure lowering function of the air motor.

Assume that the result is the one shown in FIG. 3. The supply air pressure to the air motor 65 is stable (measured by the air pressure sensor 65a), and the pressure variation when the air motor 65 is switched appears at the fluid pressure sensor 73 provided at the outlet of the supply pump 64. The pressure variation after the pressure is adjusted to a fixed value by the pressure controller 67 appears at the fluid pressure sensor 75 provided at the outlet of the pressure controller 67. As apparent from FIG. 3, the pressure variation when the air motor 65 is switched cannot be absorbed by the pressure controller 67 and it appears as the pressure variation at the fluid pressure sensor 75. This means that the pressure lug function of the air motor 65 is too large.

Functional test of the supply pump

For the functional test of the supply pump 64, as similar to the functional test of the air motor 65, the air pressure sensor 65a and the fluid pressure sensors 73, 75 are utilized.

Figure 4:
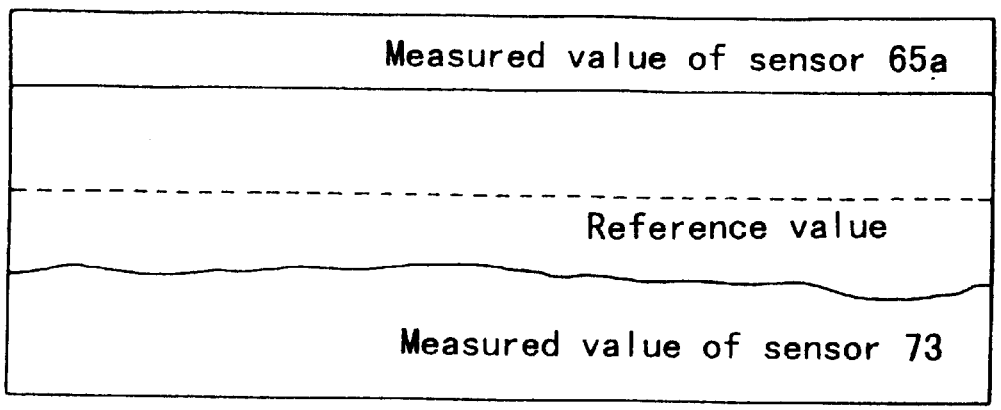
FIG. 4 is a result of the test of an exhaust pressure function of the air motor.

In order to test the generating torque of the supply pump 64, the valve selector 66 is operated and the controller 67 is operated to operate the spray gun 63 so that the supply pump 64 is operated repeatedly. Assume that the result printed our from the printer 77 is the one shown in FIG. 4. As shown in FIG. 4, the supply air pressure of the air pressure sensor 65a is stable but the detected value of the fluid pressure sensor 73 is varied, which means the generating torque of the supply pump 64 is abnormal.

Next, the piston leakage of the supply pump 64 is tested. The valve selector 66 is operated. While the pressure controller 67 is operated and the spray gun 63 is shut off, the supply pump 64 is operated repeatedly. At this point, if the supply pump 64 is worked normally, the pump 64 is terminated by the overloaded. However, if the leakage occurs, the supply pump 64 continues working. This can be known from a detecting signal of the micro switches 81, 82 for detecting the position of the detecting unit 80a of the piston rod 80.

Figure 5:
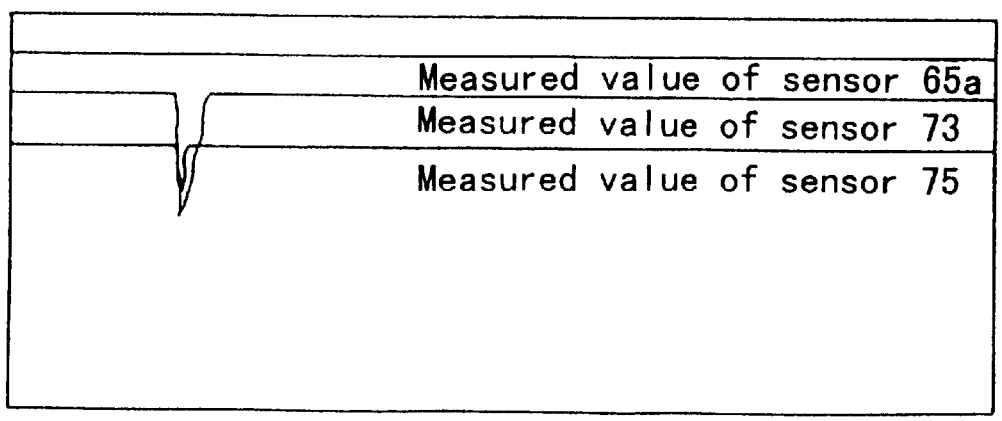
FIG. 5 is a result of the test of a pressure lowering function of the air motor.

Next, the pressure lug of the supply pump 64 is tested. The valve selector 66 is operated. While the pressure controller 67 is operated and the spray gun 63 is operated, the supply pump 64 is operated repeatedly. Assume that the result printed out from the printer 77 is the one shown in FIG. 5. The supply air pressure to the air motor 65 is stable (which means that the air pressure sensor 65a does not sense the variation), and the pressure variation when the supply pump 64 is switched appears at the fluid pressure sensor 73. The pressure variation after the pressure is adjusted to a fixed value by the pressure controller 67 appears at the fluid pressure sensor 75. As apparent from FIG. 5, the pressure variation when the supply pump 64 is switched cannot be absorbed by the pressure controller 67 and it appears as the pressure variation at the fluid pressure sensor 75. This means that the pressure lug function of the supply pump 64 is too large.

Functional test of the valve selector

For the functional test of the valve selector 66, the standard units are used for each painting devices, and the fluid pressure sensor 73 and the fluid pressure sensor 74 are utilized.

Figure 6:
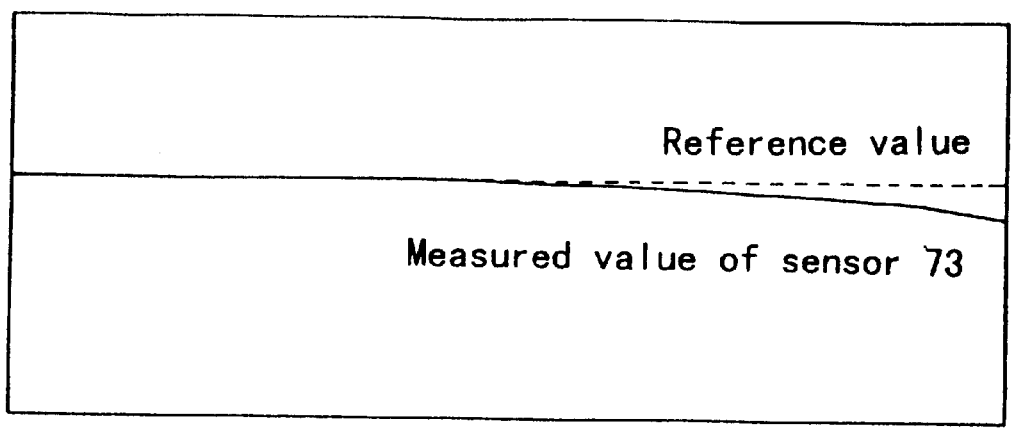
FIG. 6 is a result of the test of a leakage function of a valve selector.

First, in order to test the leakage of the valve selector 66, the supply pump 64 is operated few times while the valve selector 66 is closed, and then the supply pump 64 is stopped. Assume that the result is the one shown in FIG. 6. The detected value of the fluid pressure sensor 73 is gradually decreased. Accordingly, the leakage defect of the valve selector 66 can be detected.

Figure 7:
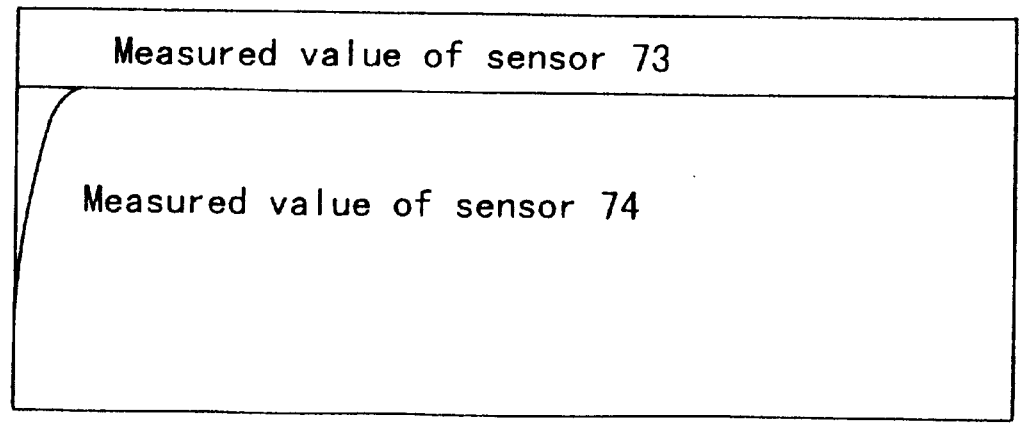
FIG. 7 is a result of the test of a valve pressure function of the valve selector.

Next, in order to test the operational lug of the valve selector 66, the supply pump 64 is operated, and the valve selector 66 is closed, and the pressure controlled 67 is operated to operate the spray gun 63. Then, the valve selector 66 is opened. Assume that the result is the one shown in FIG. 7 which is the graph output from the printer 77. The value of the fluid pressure sensor 73 arranged at the paint supply side of the valve selector 66 shows the stable value, which means that the operation of the supply pump 64 is normal. On the other hand, if the measured value of the fluid pressure sensor 74 arranged at the paint outlet of the valve selector 66 is increased as the valve selector 66 is opened and the time until it reaches the same value as the fluid pressure sensor 73 is longer than a predetermined value of the normal device, the valve selector 66 is defective.

Functional test of the pressure controller

The functional test of the pressure controller 67 is performed by the air pressure sensor 67a, the fluid pressure sensor 74 and the fluid pressure sensor 75 between the pressure controller 67 and the spray gun 63. It should be noted that the pressure controller of the painting device functional testing apparatus is replaced by a new pressure controller 67 to be installed in the manufacturing line.

The painting test is performed by operating the supply pump 64, opening the valve selector 66, and operating the spray gun 63 while the pressure controller 67 is operated. Assume that the output of the printer 77 which is the test result is the one shown in FIG. 8.

Figure 8:
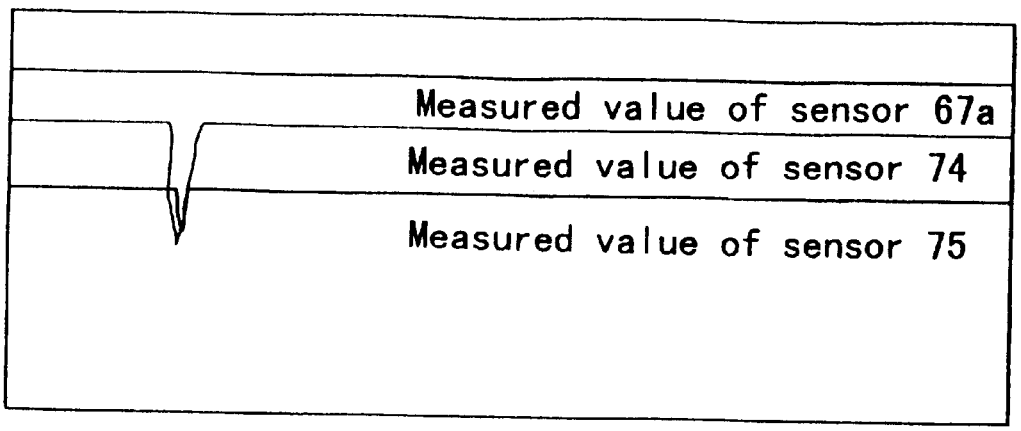
FIG. 8 is a result of the test of a follow-up function of a pressure controller.

The test is performed by varying the set value of the controller 71 of the air supply pipe 79 and testing the follow-up function and control property of the pressure controller 67 at each set value. FIG. 8 is the result of the follow-up functional test when the set value of the controller 71 is set to the predetermined value. As shown in FIG. 8, it is found from the values of the fluid pressure sensor 74 and the fluid pressure sensor 75 that the pressure controller 67 cannot follow the pressure lug of the supply pump 64.

Figure 9:
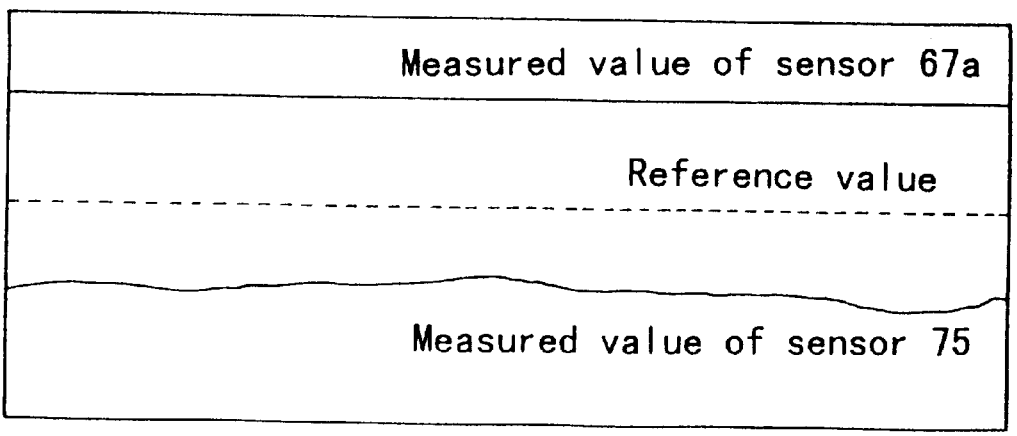
FIG. 9 is a result of the test of a pressure adjusting function of the pressure controller.

If the output result is the one shown in FIG. 9, the control property of the pressure controller 67 is known by the fluid pressure value of the fluid pressure sensor 75 when the controller 71 is set to the certain value. In FIG. 9, this fluid pressure value is varied, which means that the pressure controller 67 is defective.

Functional test of the spray gun

Similar to the above-described functional testing method, a new spray gun to be installed in the painting apparatus is set to the paint device functional testing apparatus. Here, the fluid pressure sensor 75 is utilized.

The supply pump 64 is operated and the valve controller 66 is operated, and when the pressure controller 67 is driven, the spray gun 63 is shut off. Under this condition, if the pressure of the fluid pressure sensor 75 is decreased when the supply pump 64 is stopped, it can be determined that the leakage occurs at the spray gun 63.

Further, the paint condition can be checked by observing the spray of paint from the spray gun 63 and painting the test work. If the paint on the test work is uneven, it can be considered that the switching cylinder 63a is defective or some substance is attached to the spray nozzle.

According to the method for testing the functions of the painting device of the embodiment of the present invention, the paint device functional testing apparatus is constituted as same as the manufacturing line. Accordingly, the functions of every devices to be utilized in the manufacturing line can accurately be tested, which omits the trial on the manufacturing line. Further, the trouble occurring when the unit is replaced by a new one can be prevented.

Furthermore, the functions of the new units to be installed in the actual paint supply system are tested by thus constructed painting device functional testing apparatus before they are installed in the actual paint supply system, so that it never happens that the replaced new unit does not work normally. Accordingly, the unit does not have to be changed again like the conventional method.

Next, the second embodiment of the present invention will be explained.

Figure 10:
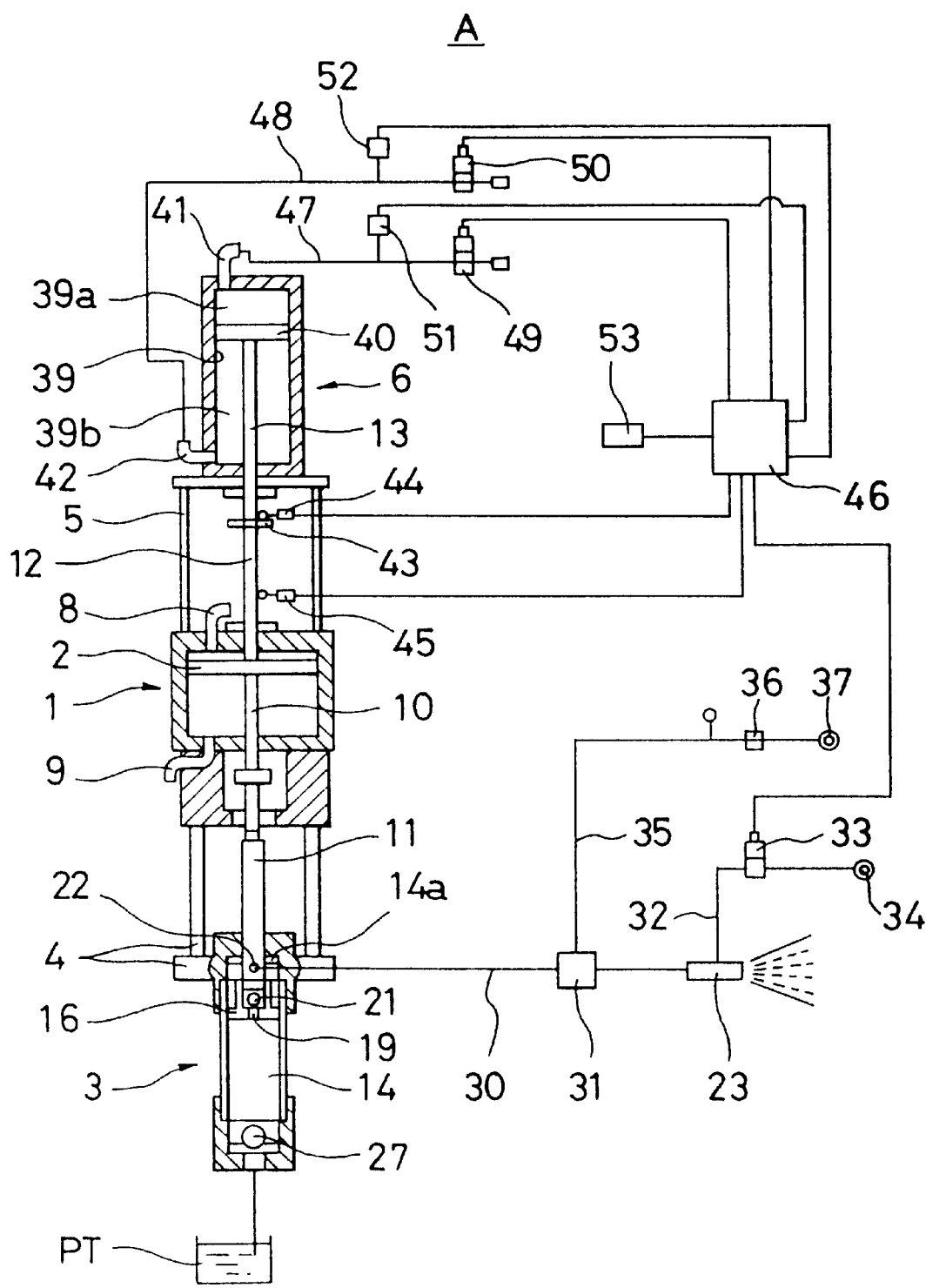
FIG. 10 is a side sectional view showing the structure of a paint supply apparatus comprising a paint leakage detecting device.
Figure 11:
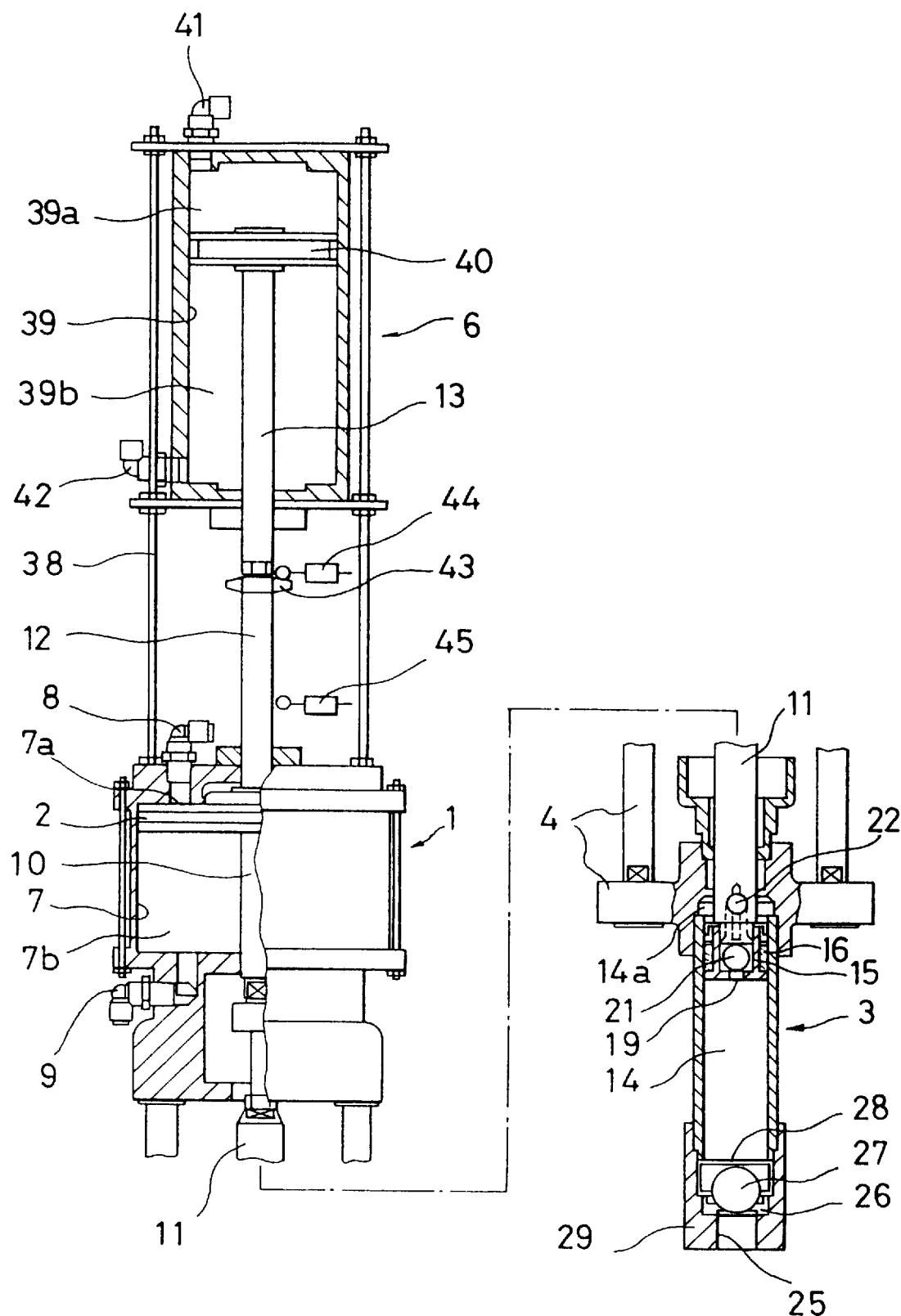
FIG. 11 is an exploded view of FIG. 10.
Figure 12:
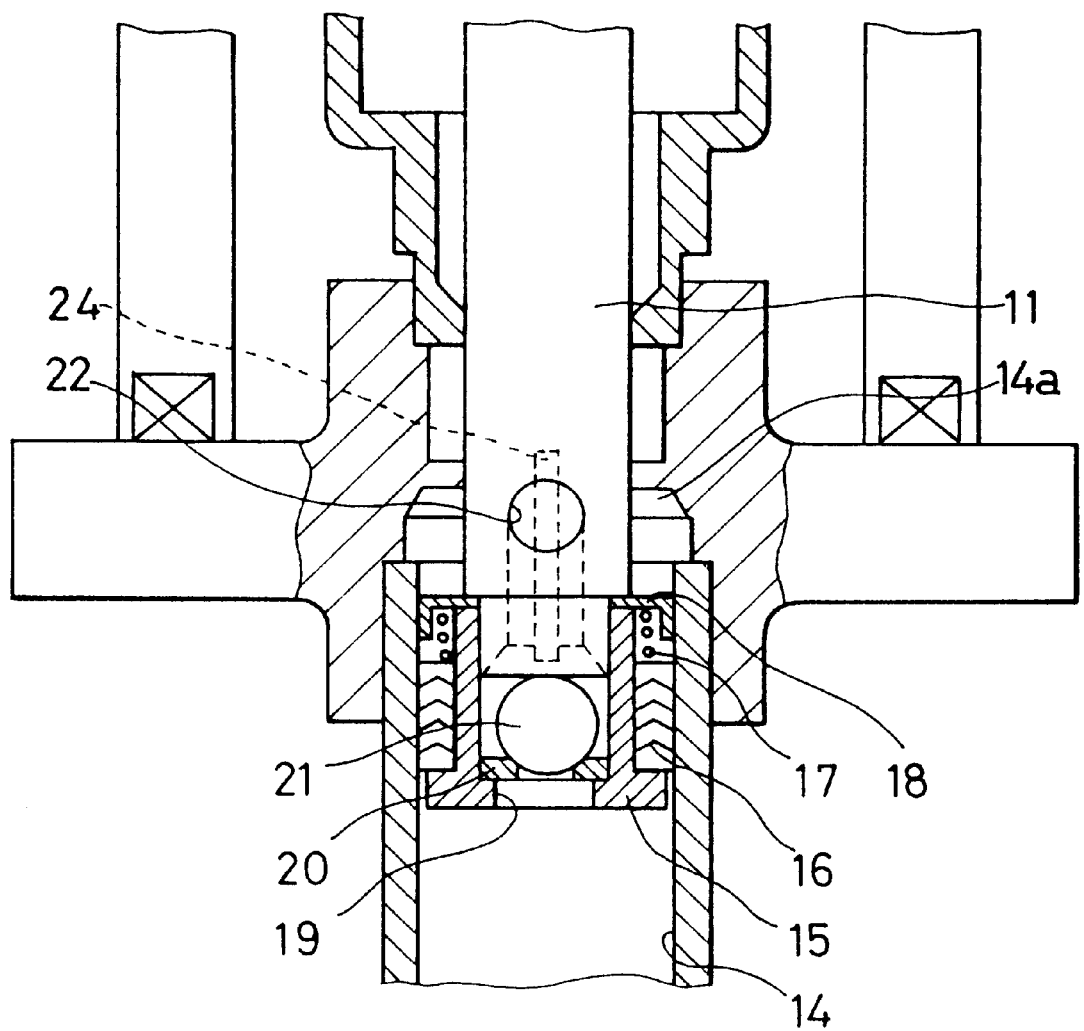
FIG. 12 is an exploded view of a paint area of FIG. 10.

The paint supply system of the painting apparatus of the present embodiment is to detect the leakage of the pump device. FIG. 10 shows the structure of the paint supply apparatus comprising a paint leakage detecting device. FIG. 11 is an exploded view of FIG. 10. FIG. 12 is an exploded view of a paint area of FIG. 10. As shown in FIG. 10, the paint supply apparatus A comprises an air-operated air cylinder device 1 for a pump, a pump device 3 for painting which sucks and ejects the paint in a paint tank PT provided below the apparatus A as a piston 2 of the air cylinder device 1 reciprocates and , which is supported by the air cylinder device 1 with a support member 4, and an air cylinder device 6 for detection provided above the air cylinder device 1 for pump with a connecting rod.

As shown in FIG. 11, the air cylinder device 1 for the pump has a cylinder room 7 constituted with an upper room 7a and a lower room 7b, air supply and exhaust pipes 8, 9 for supplying and exhausting the air, provided at upper and lower ends of the cylinder room 7, which forms a double acting cylinder, a valve rod 11 of the pump device 3 for painting connected to one end of a piston rod 10, a detecting rod 12 fixed at the upper portion of the piston 2, and a piston rod 13 of the air cylinder device 6 for detection connected to the detecting rod 12, which will be described later.

The pump device 3 for painting comprises a paint reservoir which is a cylindrical cylinder and the upper end of which is fixed at the support member 4. The lower end of the valve rod 11 is inserted into the paint reservoir 14. As shown in FIG. 12, the end of the valve rod 11 is formed in a piston shape by forming a lower end to have a small diameter, screwing a hooked cap cylindrical member 15, placing a seal member 16 between an outer wall of the hooked cylindrical member 15 and an inner wall of the paint tank 14, placing an elastic member 17 for elastically pressing the seal member 16, and a U-shaped control plate 18 for preventing the elastic member 17 from removing. Then, the valve rod 11 slides in the paint tank 14.

Further, the hooked cylindrical member 15 comprises a paint inlet hole 19 at the center, a valve seat 20 therein, and a delivery valve 21 of a ball valve in contact with the valve seat 20 therein. The valve rod 11 has a central hole and a side hole which are communicated from the other and which constitute a paint exhaust hole 22 at the lower end, so that the end of the valve rod 11 is constituted as a delivery valve mechanism. As the hooked cylindrical member 15 with the seal member 16 reciprocates, the paint in the paint tank 14 is ejected to the spray gun 23 through the upper room 14a and the pipe 30 (see FIG. 10). It should be noted that a ball control rod 24 is provided at the central hole so as to prevent the delivery valve 21 from covering the paint exhaust hole 22.

Further, as shown in FIG. 11, there provided at the lower end opening of the paint tank 14, a paint supply hole 25 communicated to the external paint tank PT (see FIG. 10) and a cap 29 comprising an inlet valve mechanism which is constituted by a valve seat 26, an inlet valve 27 of a ball valve for opening and closing the paint inlet hole 25 and a control plate 28 for limiting the back movement of the inlet valve 27.

Furthermore, as shown in FIG. 10, the paint ejected from the paint tank 14 is communicated to the spray gun 23 through a regulator 31 for adjusting pressure with a pipe 30. An air source 34 such as a compressor is connected to the spray gun 23 over the solenoid valve 33 for trigger. The regulator 31 is connected to an air supply 37 for adjusting pressure over the solenoid valve 36 for adjusting pressure with an air pipe.

As shown in FIG. 11, the air cylinder device 6 for detection is provided above the air cylinder device 1 for pump with a certain space. A connecting rod 38 placed between the air cylinder device 6 for detection and the air cylinder device 1 for pump is screwed to the upper portion of the air cylinder device 1 for pump. A cylinder room 39 is divided by a piston 40 provided therein into a rear room 39a and a front room 39b. The cylinder room 39 is formed to a double acting cylinder by providing air supply and exhaust pipes 41, 42 at an upper end of the rear room (upper room) 39a and a lower end of the front room (lower room) 39b, respectively. The lower end of the piston rod 13 is screwed to the detecting rod 12 of the air cylinder device 1 for pump.

An engaging part 43 for limit switch is attached to the detecting rod 12 near the connected part with the piston rod 13. An upper limit switch 44 and a lower limit switch 45 are externally held in the upper and lower portions of the detecting rod 13 so as to engage the engaging part 43, respectively. The upper limit switch 44 and the lower limit switch 45 are connected to a control panel 46 with a wire (see FIG. 10). As the engaging part 43 is engaged to a lever of the limit switch 44, a switch solenoid valve of an air supply (not shown) is operated, and air is supplied to the upper room 7a of the air cylinder device 1 through the air supply and exhaust pipe 8. Then, the piston 2 is moved lower. As the engaging part 43 is engaged to a lever of the lower limit switch 45, the switching solenoid valve is operated and air is supplied to the lower room 7b of the piston 2. Then, the piston 2 is raised.

As shown in FIG. 10, air in the rear room 39a and the front room 39b of the cylinder room 39 in the air cylinder device 6 for detection is exhausted from pipes 47, 48 connected to the air supply and exhaust pipes 41, 42 through the exhaust solenoid valves 49, 50, respectively. There are pressure sensors 51, 52 on the pipes 47, 48 at the down flow of the exhaust solenoid valves 49, 50.

Further, the exhaust solenoid valves 49, 50, the pressure sensors 51, 52 and the trigger solenoid valve 33 are connected to the control panel 46 with wire. The control panel 46 transmits a switching signal from the exhaust solenoid valves 49, 50 and receives a pressure signal from the pressure sensors 51, 52, a switching signal from the trigger solenoid valve 33 and an engaging signal from the limit switches 44, 45. Furthermore, a printer 53 is connected to the control panel 46 as a printing unit so as to print out the pressure signal of the pressure sensors 51, 52.

Next, the operation of thus constructed apparatus having the paint leakage detecting device and a method for detecting leakage of the paint supply system of the painting apparatus will be described.

When the limit switch 44 is engaged with the engaging part 43 of the detecting rod 12, the control panel 46 opens the trigger solenoid valve 33, of the spray gun 23 according to the engaging signal. The exhaust solenoid valve 50 communicated to the front room 39b of the air cylinder device 6 for detection with the pipe 48 is closed, and the exhaust solenoid valve 49 communicated to the rear room 39a is opened. Then, air is supplied from the upper air supply and exhaust pipe 8 of the air cylinder device 1 for pump and air is exhausted from the lower air supply and exhaust pipe 9. Whereby, the piston 2 of the air cylinder device 1 is lowered, and the valve rod 11 of the painting pup device 3 is lowered through the piston rod 10 as the piston 2 is lowered. The paint in the paint tank 14 is supplied to the paint exhaust hole 22 and the upper room 14a from the paint inlet hole 19 of the valve rod 11 through the delivery valve 21.

Concurrently, the piston of the air cylinder room 39 for detection is lowered, and air pressure in the front room 39b and the pipe 48 is increased.

Figure 13:
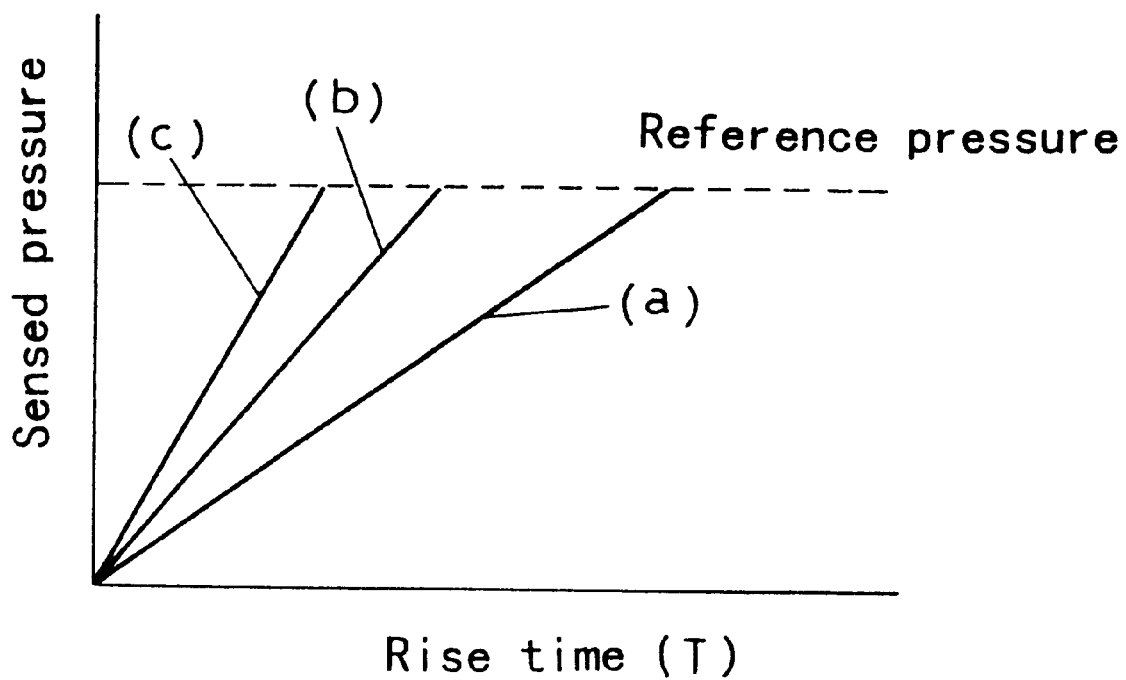
FIG. 13 is a graph showing the time change of the exhaust pressure of paint.
Figure 14:
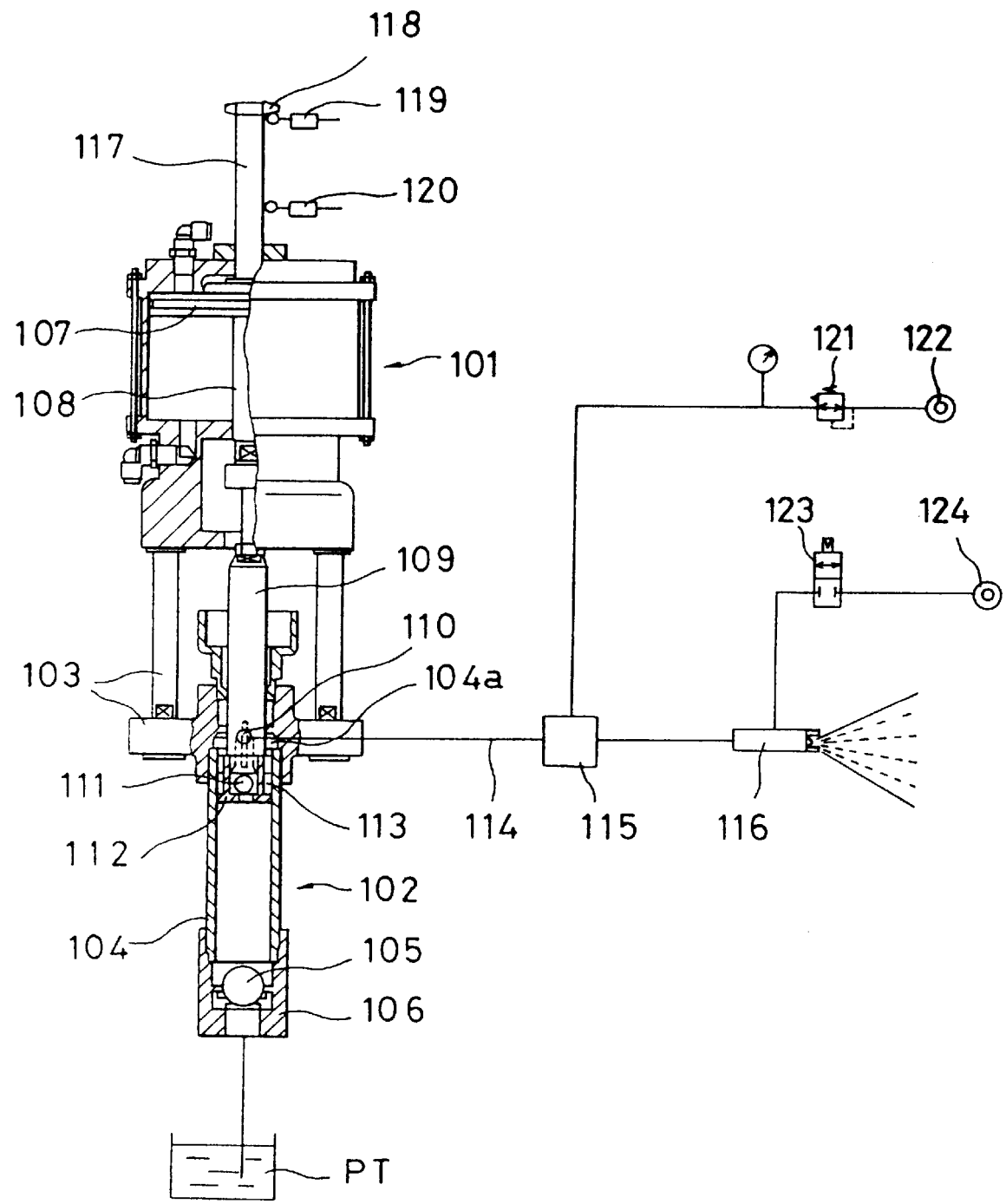
FIG. 14 is a side sectional view showing the conventional paint supply apparatus which does not comprises a paint leakage detecting device.

At this point, if the seal member 16 at the end of the valve rod 11 works normally, the paint is supplied to the upper room 14a only through the normal passage of the paint inlet hole 19, the delivery valve 21 and the paint exhaust hole 22, so that the speed of the lower movement of the valve rod 11 is suppressed owing to the slide resistance between the seal member 16 and the paint tank 14 and the inlet resistance of the paint in the above-mentioned normal passage. Accordingly, the increasing speed of the air pressure of the front room 39b of the air cylinder 6 for detection and the pipe 48, which is detected by the pressure sensor 52 is slow. At the printer 53, the long rising time that the pressure reaches a predetermined reference pressure is recorded, which is shown by a line a of FIG. 13.

On the other hand, if the seal member 16 at the end of the valve rod 11 does not work normally, there is leakage of paint from the seal member 16 since the slide resistance between the seal member 16 and the paint tank 14 is small. The inlet resistance of the paint supplied to the upper room 14a is small. Accordingly, the speed of the lower movement of the valve rod 11 is fast, and the speed of the lower movement of the piston 40 of the air cylinder device 6 becomes fast. The increasing speed of the air pressure of the front room 39b of the air cylinder 6 for detection, which is detected by the pressure sensor 52 is fast. Then, as shown by the line b or c of FIG. 13, the printer 53 prints the relatively short rising time.

Therefore, if the air pressure in the case of the normal seal member 16 is printed out by the printer 53 before the device is operated, the condition of the seal member can easily be determined by comparing the printout.

It should be noted that when the lower limit switch 45 is engaged with the engaging part 43, if the exhaust solenoid valve 49 communicated to the rear room 39a of the air cylinder device 6 is closed and the other exhaust solenoid valve 50 is opened, the leakage of the seal member 16 when the valve rod 11 is raised can be detected by the pressure sensor 51.

Thus, the paint leakage from the seal member 16 of the pump device can be detected at earlier stage by providing the air cylinder device 6 for detection moved together with the air cylinder device 1 for pump, detecting the change of the internal air pressure according to the pressure signal from the pressure sensor by the control panel 46 and recording it by the printer 53. Accordingly, the paint defect due to the paint pulsation can be prevented. Further, the wear of the piston 2 in the air cylinder device 1 for pump can be suppressed, which increases the durability of the air cylinder device 1.

Furthermore, the air cylinder device 6 for detection is readily installed in the air cylinder device 1 for pump by screwing the cylinder body with the connecting rod 5, and the piston rod 13 is readily connected to the detecting rod 12 of the air cylinder device 1 for pump. Accordingly, the air cylinder device 6 for detection can be removed easily. Therefore, the air cylinder device 6 for detection can be installed in the exist paint supply device, which is very economic and which makes the maintenance easier.

While the invention has been shown and described with reference to the illustrated embodiments, it should be understood that various changes in form and details may be made without departing from the scope of the invention which is defined in the appended claims.

What is claimed is:

1. A method for testing functions of painting devices of a painting apparatus, said painting devices including an air supply source, an air motor driven by air from said air supply source, a supply pump operated by said air motor, a plurality of paint tanks each containing paint, a valve selector for switching paints to be used, a spray gun having a switching cylinder, a spray nozzle for spraying the paint, and a pressure controller for adjusting the pressure applied on the paint to be sprayed, said paint being sprayed from said spray gun by sucking said paint from one of said paint tanks with said supply pump; said method for testing functions of painting devices comprising the steps of:

providing a first fluid pressure sensor between said supply pump and said valve selector and a second fluid pressure sensor between said valve selector and said spray gun;

providing a first air pressure sensor between said air supply source and said air motor and a second air pressure sensor between said air supply source and said pressure controller;

measuring a supply pressure and an exhaust pressure of at least one of said air motor, said supply pump, said valve selector and said pressure controller, by said fluid pressure sensors and said air pressure sensors; and comparing the measured supply pressure and the measured exhaust pressure, thereby testing the functions of said painting.

2. A method for testing functions of painting devices according to claim 1, wherein, said first air pressure sensor is further provided adjacent said air motor and said second air pressure sensor is provided adjacent said pressure controller; and said first fluid pressure sensor is provided between said supply pump and said valve selector, said second fluid pressure sensor is provided between said valve selector and said pressure controller, and a third fluid pressure sensor is provided between said pressure controller and said spray gun; and functions of each of said air motor, said supply pump, said valve selector, and said pressure controller are tested by measuring a supply pressure an exhaust pressure of each of said air motor, supply pump, said valve selector, and said pressure controller, said step of comparing further including the step of detecting the difference between the measured supply and exhaust pressures to thereby test each of said air motor, supply pump, said valve selector, and said pressure controller.

3. A method for testing functions of painting devices of a painting apparatus according to claim 1, wherein normally operated devices are installed in said test painting apparatus; and one of said normally operated devices is replaced by a new device to be tested; and the functions of the replaced new device are tested by driving said test painting system and spraying the paint.

* * * * *